May 4, 1954

F. I. EPLEY 2,677,354

EQUALIZATION OF TEMPERATURE IN
SEPARATELY FIRED SUPERHEATERS

Filed March 25, 1948

FREDERIC I. EPLEY
INVENTOR.

BY

May 4, 1954

F. I. EPLEY 2,677,354

EQUALIZATION OF TEMPERATURE IN
SEPARATELY FIRED SUPERHEATERS

Filed March 25, 1948

FREDERIC I EPLEY
INVENTOR.

BY

Patented May 4, 1954

2,677,354

UNITED STATES PATENT OFFICE 2,677,354

EQUALIZATION OF TEMPERATURE IN SEPARATELY FIRED SUPERHEATERS

Frederic I. Epley, Rockville Centre, N. Y., assignor to Combustion Engineering, Inc., a corporation of Delaware Application March 25, 1948, Serial No. 16,956

4 Claims. (Cl. 122—485)

1

The present invention relates to heat exchange apparatus and particularly in improvements in separately fired superheaters for producing high temperature steam.

In separately fired superheaters where the steam flows in a number of parallel paths which are distributed transversely of the gas passes and the furnace, stratification of the gases and improper burner adjustments may produce inequalities in gas temperatures across the furnace and gas passages with the result that some of the superheater elements may be subjected to higher temperatures than others located adjacent them at either side thereof. With demanded steam temperatures going higher and higher it becomes increasingly necessary to operate the tube materials more closely to their ultimate temperature limits. To accomplish this safely it is necessary to at least substantially equalize the steam temperatures in the various multiple paths of flow. The present invention contemplates doing this by maintaining moderate furnace temperatures through recirculation of some of the flue gas leaving the superheater and dividing the furnace transversely into a plurality of zones to which varying amounts of gases may be returned for the purpose of equalizing the gas temperatures at different points against the furnace.

The invention will be best understood upon consideration of the following detailed description of an illustrative embodiment thereof when read in conjunction with the accompanying drawing in which.

Figures 1, 2:
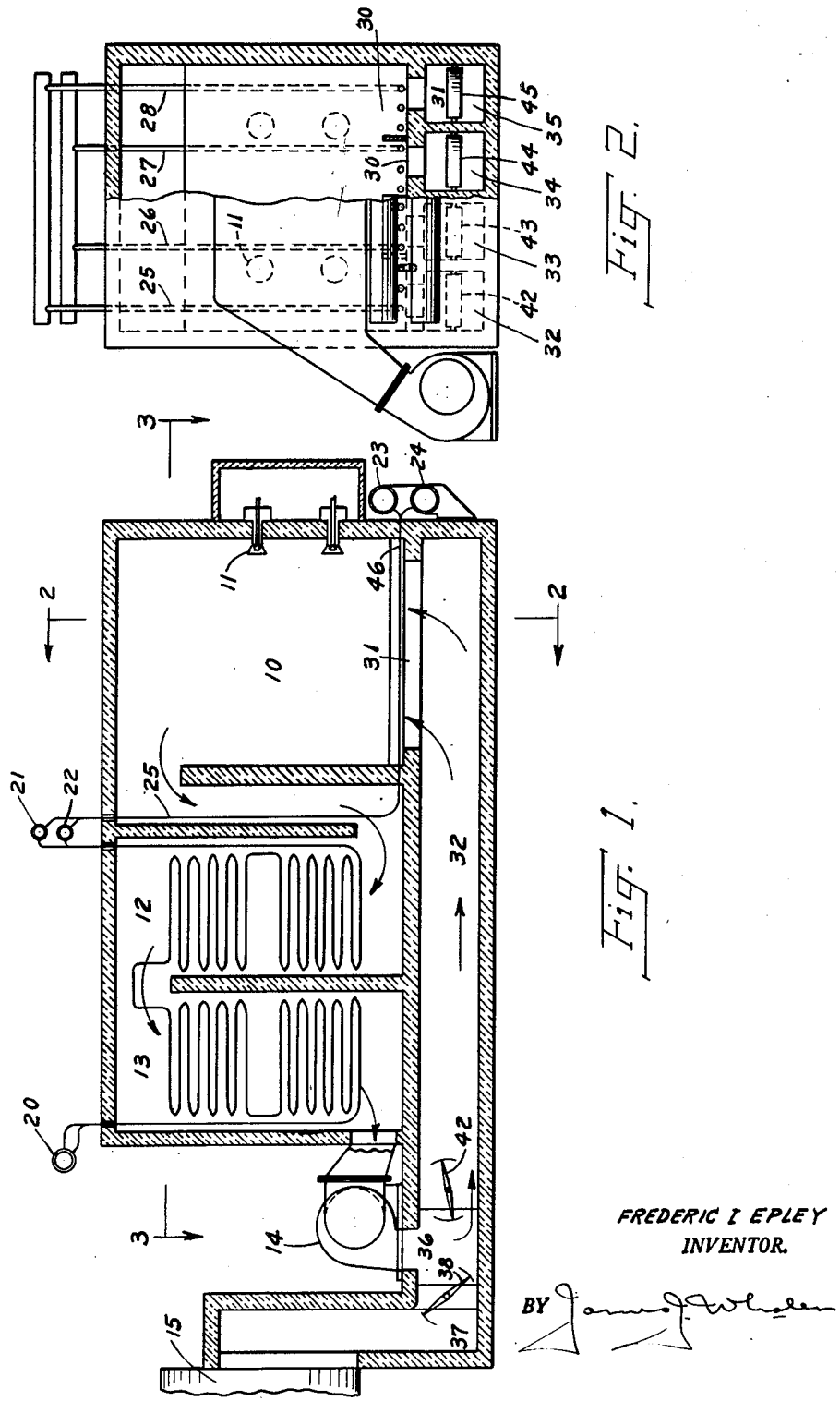
Figure 1 is a sectional elevational view of a separately fired superheater installation embodying the present invention.
Figure 2 is an end elevational view partly in section on the line 2—2 in Figure 1.
Figure 3:
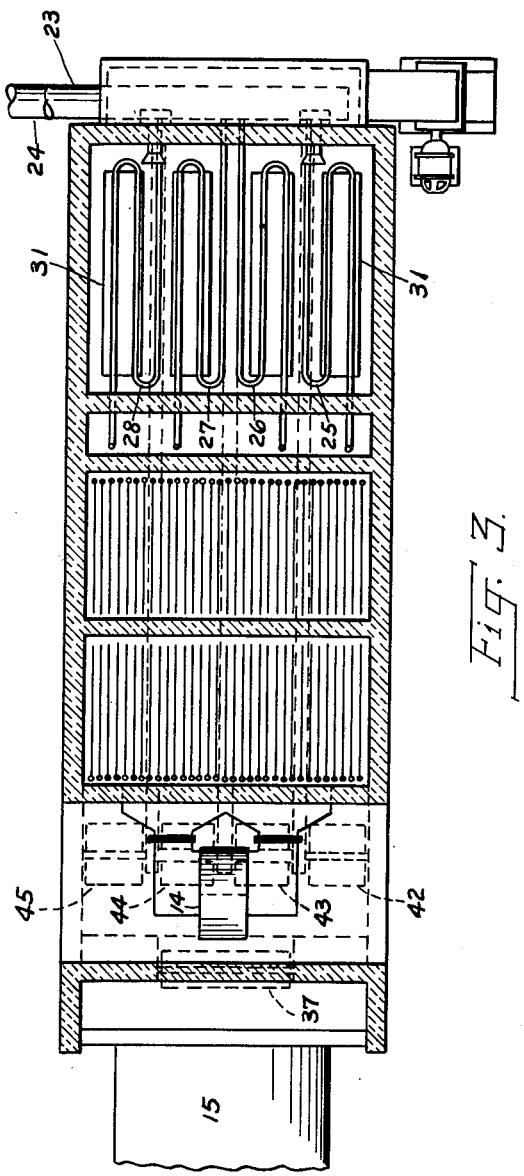
Figure 3 is a sectional plan view on the line 3—3 in Figure 1.

In the drawing the numeral 10 designates the furnace of a separately fired superheater installation which is fired by a plurality of oil burners 11, of which four are illustrated. The gases of combustion flow from the furnace 10 through the gas passages 12 and 13, being drawn from the furnace by an induced draft fan 14 and delivered by the latter to a waste heat boiler 15. Disposed in the gas passages 12 and 13 are a plurality of tubular superheater elements disposed in side by side relation to form parallel paths of flow from the inlet header 20 to one or more intermediate headers 21, 22. From the intermediate headers 21, 22 the partially superheated steam flows through the tubular elements of a radiant superheater to the outlet headers 23, 24.

In the arrangement shown the radiant superheater is disposed on the inner end wall and on the floor of the furnace chamber 10 and the tubular elements form four flow circuits 25, 26, 27, and 28 between the intermediate headers 21, 22 and the outlet headers 23, 24. The portions of these superheater elements that lie on the floor of the furnace are disposed in troughlike chambers 30 that extend longitudinally of the furnace and which may be formed of ceramic or refractory material and the bases of which are connected through the openings 31 with four gas return ducts 32, 33, 34, and 35, that is, one for each of the four separate paths for flow through the radiant superheater. The ducts 32 to 35 inclusive extend beneath the furnace and below the convection passes 12, 13 to a point where they may be placed in communication with a chamber 36 into which the delivery side of the induced draft fan 14 discharges the partially cooled gases. In the duct 37 leading from chamber 36 to waste heat boiler 15 there is located a damper 38 and there are individual dampers 42, 43, 44 and 45 provided in the ducts 32 to 35 respectively for controlling the volume of gases that may return through them to various locations spaced transversely of the furnace. Each of these dampers may be automatically controlled by a separate thermocouple installed near the outlet end of each radiant element 25 to 28, respectively, and acting through separate damper motors. Operation of the several dampers 42–45 in response to delivery temperature of steam in the radiant elements 25–28 results in return to various positions transversely of the furnace an amount of partially cooled gas sufficient to temper the gases at any point transversely of the furnace so as to provide a substantially equalized temperature. For example, if the superheater were to deliver steam at a desired temperature of 1500° F. and stratification of gases or combustion conditions in the furnace due to burner operation should result in temperatures of 1400° in the radiant elements 25 and 28 adjacent the side walls of the furnace with temperatures of 1600° in the centrally positioned elements 26 and 27, an amount of gas would be returned through each of the middle ducts 33 and 34 to reduce the temperature of steam at the outlet of the elements 26 and 27 to 1500° while the dampers in the outer ducts 32 and 35 associated with the elements 25 and 28 would be partially closed to cut down the quantity of returned gas and permit increase in steam temperature to 1500°. Thus, by the selective return of larger or smaller volumes of gas to locations spaced transversely of the furnace the outlet temperature of steam in the various flow pass may be substantially equalized at 1500°.

What I claim is:

1. In a superheater installation having a furnace, burner means spaced transversely of one wall of the furnace for injecting fuel into and burning it in the furnace, means forming a gas pass leading from the furnace, heat absorbing elements located in said pass, and an induced draft fan, so connected to the outlet end of said pass as to withdraw gases from the furnace to flow over said elements; a plurality of radiantly heated tubular superheater elements disposed in spaced relation and transversely of the furnace with respect to said one wall; a plurality of gas ducts extending from the delivery side of said fan to the furnace and having outlets communicating with the latter at locations spaced transversely of said one wall corresponding to the spacing of said superheater elements, said outlets being positioned to bring said recirculated gases into heat exchange relation with said superheater elements; and individual damper means associated with said ducts and selectively operable to permit return of varying amounts of gases, partially cooled by flow over said heat absorbing elements, to the various selected positions spaced transversely of the furnace corresponding to the locations of particular superheater elements.

2. A superheater installation as recited in claim 1 in which said radiantly heated tubular superheater elements extend longitudinally of the furnace along its floor in spaced relation transversely thereof and said plurality of gas ducts extend beneath the furnace.

3. A superheater installation as recited in claim 2 in which said outlets for gas return are formed in the floor of the furnace.

4. In a superheater installation having a furnace, burner means spaced transversely of one end wall of the furnace for injecting fuel into and burning it in the furnace, means forming a gas pass leading from the furnace, heat absorbing elements located in said pass, and an induced draft fan so connected to the outlet end of said pass as to withdraw gases from the furnace to flow over said elements; a plurality of radiantly heated tubular superheater elements extending longitudinally of the furnace along its inner end wall and along the floor of the furnace in spaced relation transversely of said one wall of the furnace; a plurality of gas ducts extending from the delivery side of said fan in parallel relation longitudinally of the furnace and having outlets communicating with the furnace at locations spaced transversely of said one wall thereof in correspondence with the spacing of said superheater elements, said outlets being positioned to bring said recirculated gases into heat exchange relation with said superheater elements; and individual damper means associated with said ducts and selectively operable to permit return of varying amounts of gases, partially cooled by flow over said heat absorbing elements, to various selected positions spaced transversely of the furnace corresponding to the particular ones of said superheater elements.

References Cited in the file of this patent

UNITED STATES PATENTS

| Number | Name | Date |
|---|---|---|
| 1,691,698 | Broido | Nov. 13, 1928 |
| 1,929,890 | Huet | Oct. 10, 1933 |
| 1,938,699 | Huet | Dec. 12, 1933 |
| 2,368,629 | Beach | Feb. 6, 1945 |

FOREIGN PATENTS

| Number | Country | Date |
|---|---|---|
| 371,985 | Italy | June 12, 1939 |
| 435,883 | Great Britain | Oct. 1, 1935 |
| 504,114 | Great Britain | Apr. 14, 1939 |
| 541,050 | Germany | Sept. 21, 1929 |